US005784065A

United States Patent [19]

Kakutani

[11] Patent Number: 5,784,065
[45] Date of Patent: Jul. 21, 1998

[54] IMAGE PROCESSING APPARATUS FOR COLOR-COMPENSATING ACCORDING TO COLOR REPRODUCTION PROPERTIES OF AN IMAGE APPARATUS

[75] Inventor: Toshiaki Kakutani, Nagano, Japan

[73] Assignee: Seiko Epson Corporation, Tokyo, Japan

[21] Appl. No.: 735,343

[22] Filed: Oct. 22, 1996

Related U.S. Application Data

[63] Continuation of Ser. No. 205,103, Mar. 3, 1994, Pat. No. 5,600,764.

[30] Foreign Application Priority Data

| Mar. 3, 1993 | [JP] | Japan | 5-042973 |
| Apr. 14, 1993 | [JP] | Japan | 5-087529 |
| Dec. 28, 1993 | [JP] | Japan | 5-352899 |

[51] Int. Cl.$^6$ .................................................. G06F 15/00
[52] U.S. Cl. ............................................................. 345/431
[58] Field of Search ........................ 395/131, 132, 395/133; 345/431, 432, 433, 150, 153

[56] References Cited

U.S. PATENT DOCUMENTS

| 5,049,986 | 9/1991 | Aono | 358/80 |
| 5,600,763 | 2/1997 | Green et al. | 395/120 |
| 5,600,764 | 2/1997 | Kakutani | 395/131 |
| 5,611,029 | 3/1997 | Watters et al. | 395/131 |

FOREIGN PATENT DOCUMENTS

487304A2  5/1992  European Pat. Off. .

OTHER PUBLICATIONS

Lehar et al., "High Speed Manipulation of the Color Chromaticity of Digital Images", 1984 IEEE CG&A, pp. 34–39.

Stone et al., "Color Gamut Mapping and the Printing of Digital Color Images", Oct. 1988, ACM Transactions of Graphics, vol. 7.

Foley et al., "Computer Graphics Principles and Practice", 2nd Ed. 1990, pp. 599–600.

*Primary Examiner*—Phu K. Nguyen
*Attorney, Agent, or Firm*—Sughrue, Mion, Zinn, Macpeak & Seas, PLLC

[57] ABSTRACT

An image processing apparatus in which the number of operations necessary for color correction processing is made smaller than the number of operations necessary for gradation number conversion processing in a later process without causing deterioration of image quality, so that color correction processing and gradation number conversion processing can be conducted at high speed. The number of gradations capable of being converted in the pre-gradation number conversion section is larger than that in the post-gradation number conversion section. The pre-gradation number conversion section conducts pre-gradation number conversion for converting the gradation number of color components of R, G, B of the original color image data into the gradation coordinate value of the most appropriate grid point in the color space. The color compensating section reads out the gradation compensating data corresponding to the color image data subjected to the pre-gradation number conversion from the color compensating table memory, so that the gradation number of each color component of Rk, Gk, Bk is compensated and outputted. The post-gradation number conversion section conducts post-gradation number conversion on the data obtained from the color compensating section so that a finally desired gradation number can be obtained.

6 Claims, 10 Drawing Sheets

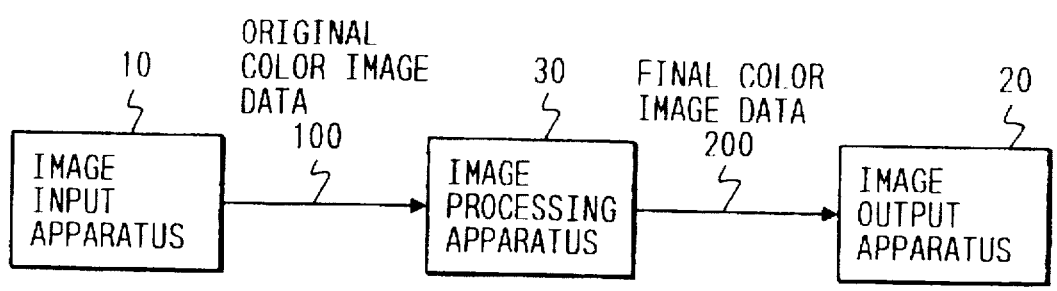
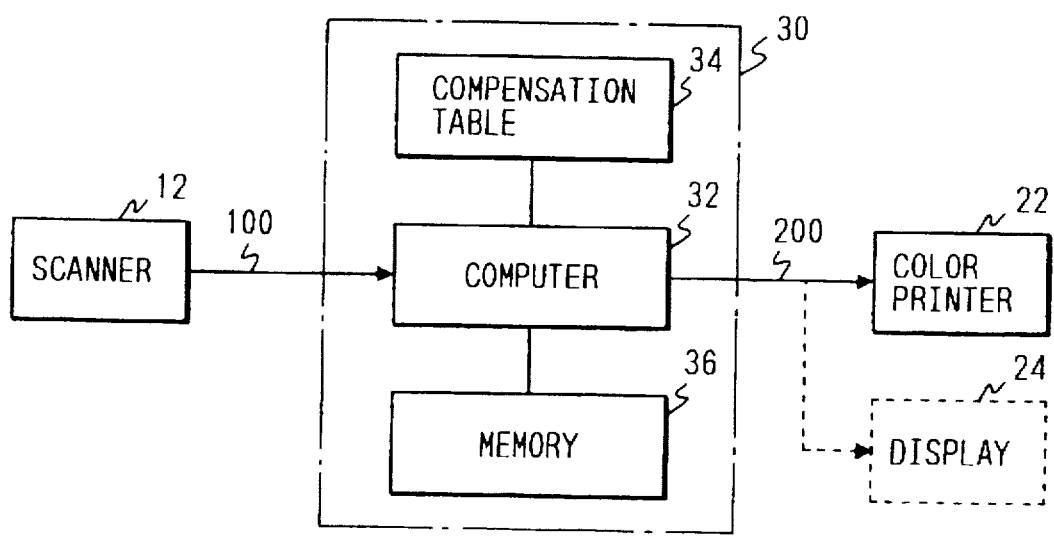

FIG. 3
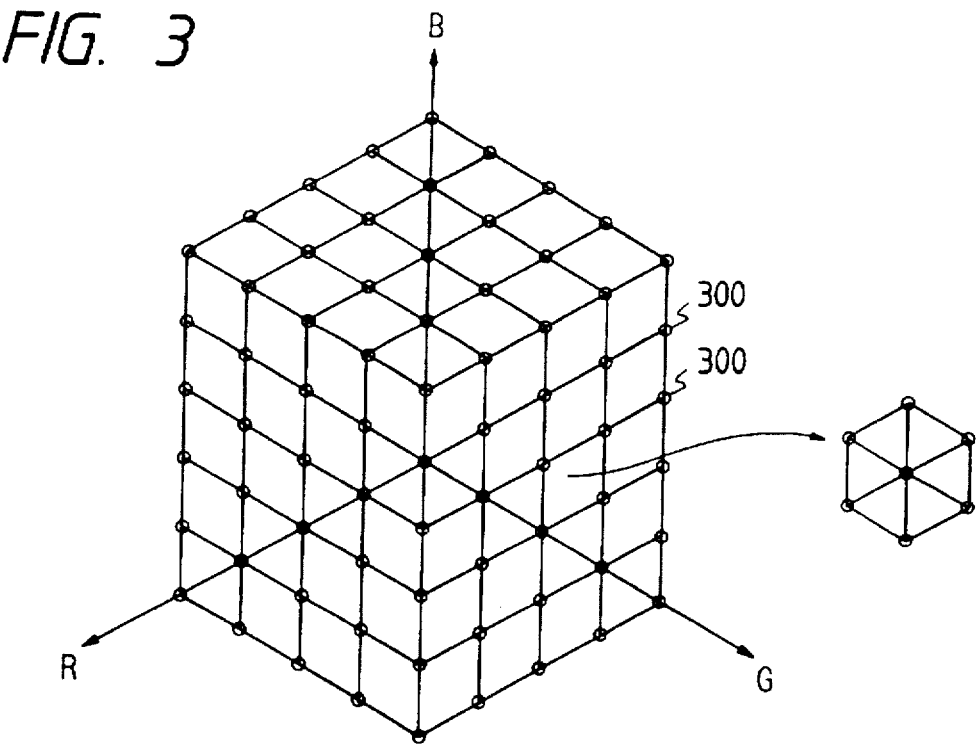
FIG. 5
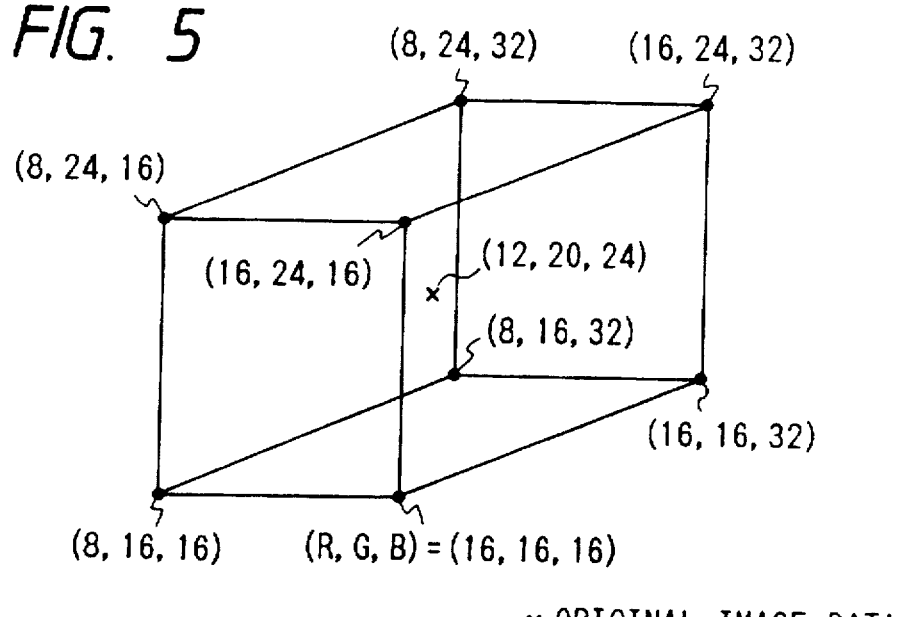
× ORIGINAL IMAGE DATA
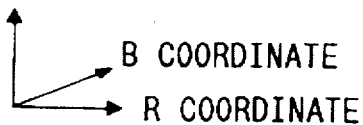

\* : TARGET PIXEL

\* : TARGET PIXEL

```
#define Nr 16
define Ng 16
define Nb  8
unsigned char C_table[Nr][Ng][Nb];
unsigned char M_table[Nr][Ng][Nb];
unsigned char Y_table[Nr][Ng][Nb];
```

```
C=C_table[i][j][k];
M=M_table[i][j][k];
Y=Y_table[i][j][k];
```

WHEN data_C[p][q]≧slsh, result_C=255
data_C[p][q]≧slsh  ∴  result_C=255
data_C[p][q]<slsh  ∴  result_C=0
WHEN data_C[p][q]<slsh, result_C=0 define Nr 16
define Ng 16
define Nb  8
unsigned char C_table[Nr][Ng][Nb];
unsigned char M_table[Nr][Ng][Nb];
unsigned char Y_table[Nr][Ng][Nb];
unsigned char K_table[Nr][Ng][Nb];

IMAGE PROCESSING APPARATUS FOR COLOR-COMPENSATING ACCORDING TO COLOR REPRODUCTION PROPERTIES OF AN IMAGE APPARATUS

RELATED APPLICATIONS

This application is a Continuation of U.S. Ser. No. 08/205,103 filed Mar. 3, 1994, now U.S. Pat. No. 5,600,764.

BACKGROUND OF THE INVENTION

The present invention relates to an image processing apparatus, and more particularly to an image forming apparatus which conducts color correction processing on inputted color image data and outputs the processed color image data.

Conventionally, an image processing apparatus is well known in which color documents and the like are read out by an image input section such as a scanner, and the image data read out by the scanner is reproduced, for example, by a display or a color printer.

However, an image output apparatus such as a display or color printer has its own specific color reproduction properties. Therefore, it is difficult to reproduce the colors of an inputted color image precisely using an input device such as a scanner.

For this reason, conventionally a method has been proposed in which color correction processing is conducted in accordance with the color reproducing properties of the image output apparatus. One such color correction method described disclosed in Japanese Unexamined Patent Publication No. 63-2669. According to this method, a three-dimensional color correction table of RGB is prepared corresponding to all combinations of three-color components of red (R), green (G) and blue (B). Contents of color correction are stored at all three-dimensional coordinate positions, and color correction is conducted referring to this table.

However, according to this color correction method, the capacity of the memory for the color correction table is large. Therefore, the above color correction method is not suitable for practical use. For example, when the gradation of an inputted original color image data is expressed with eight bits (256 gradations) for each color of R, G and B, the number of colors is 16,780,000 (=$256^3$). Thus, it is necessary to provide a memory capacity of 48 megabytes for the color correction table to store the R, G and B data.

In order to reduce the memory capacity of the color correction table, proposals have been made in Japanese Unexamined Patent Publication Nos. 4-144481 and 4-185075. In one such apparatus, a color correction table is not provided for all combinations of R, G and B. When only the results of color correction are stored with respect to the grid points formed by dividing the three-dimensional color space of R, G and B at appropriate intervals, the capacity of the table memory is reduced. In the case of color data which is not precisely coincident with the grid points, reference is made to the color correction data of a plurality of adjacent grid points so that color interpolation processing can be performed.

For example, in Japanese Unexamined Patent Publication No. 4-185075 an example is described in which color correction processing is conducted on the original color image data expressed by L*, a* and b* using the CIE uniform color space calorimetric system, and at the same time a conversion of the calorimetric system is conducted from L*, a* and b* to CMYK. In this case, in order to convert the values of L*, a* and b* of the original color image into C, M, Y, K corresponding to the amounts of ink of cyan, magenta, yellow and black, compensation data of eight grid points adjacent to the original color image data is referenced, and a color interpolation calculation is performed with respect to the inputted original color image data.

For example, an expression of interpolating operation to find a Y component is expressed as follows:

$$Y = (1-\gamma_1)(1-\gamma_a)(1-\gamma_b)Y(1, a, b) + \\ \gamma_1(1-\gamma_a)(1-\gamma_b)Y(1+1, a, b) + \\ (1-\gamma_1)\gamma_a(1-\gamma_b)Y(1, a+1, b) + \\ (1-\gamma_1)(1-\gamma_a)\gamma_b Y(1+1, a, b+1) + \\ \gamma_1\gamma_a(1-\gamma_b)Y(1+1, a+1, b) + \\ \gamma_1(1-\gamma_a)\gamma_b Y(1+1, a, b+1) + \\ (1-\gamma_1)\gamma_a\gamma_b Y(1, a+1, b+1) + \\ \gamma_1\gamma_a\gamma_b Y(1+1, a+1, b+1)$$

(Detailed descriptions of the variables can be found in the cited reference.)

Eight values of $Y(1, a, b), \ldots, Y(1+1, a+1, b+1)$ on the right side of the expression are values of yellow obtained as a result of reference to the color correction table with respect to eight grid points adjacent to the target data. The interpolating operation is conducted in such a manner that these values are multiplied by a weight which is in inverse proportion to a distance in the color space so as to find the mean.

Although it is possible to reduce the capacity of the color correction table according to the prior art described above, it is necessary to perform multiplication 24 times and also to perform addition seven times for conducting a compensating operation with respect to one color component. Therefore, the number of operations is greatly increased, so that the processing time is increased.

Especially when image data is subjected to gradation number conversion in accordance with the gradation number (number of possible gradations) of the image output apparatus in addition to the color correction processing described above, the color correction processing requires a very large number of operations compared with the gradation number conversion processing. Therefore, the processing time is greatly increased.

That is, in the case where a color printer or a display is used for an image output apparatus in which color image data can be outputted for each pixel and further the gradation number capable of being outputted is different from the original color image data, it is necessary to perform gradation number conversion processing by which the gradation number of the original color image data is reduced to the gradation number N capable of being outputted, that is, it is necessary to perform N-gradation processing. For example, in the case where a color printer is used for the image output apparatus, in which gradation control cannot be conducted for each dot, the gradation number capable of being outputted is N=2. In this case, binary-coded processing is required, by which the gradation number of each color component of the original color image data is reduced to two, which corresponds to ON/OFF printing of dots.

Various methods are employed for processing in which the gradation number is made to N. In order to obtain the best image quality, the error diffusion method and the minimum average error method in the same group are well known. The error diffusion method and the minimum average error method are characterized in that the resolution is high and it is possible to continuously reproduce the gradation.

According to the minimum average error method, the following pixel data is corrected by the weighted mean value of the quantization errors which have occurred in the adjacent pixels, the values of which have already been N-coded. On the other hand, according to the error diffusion method, the quantization error which has occurred when a certain pixel is N-coded is diffused to the adjacent pixels which have not yet been N-coded.

It can be considered that the minimum average error method and the error diffusion method are precisely equivalent except for the handling at the image end. An example of binary-coded processing by the error diffusion method is disclosed in Japanese Unexamined Patent Publication No. 1-284173, entitled "Image Processing Method and Apparatus Thereof". Examples of multi-coded processing in which the value of N is not less than two are disclosed in Japanese Unexamined Patent Publications Nos. 3-18177, 3-34767, 3-80767 and 3-147480.

The aforementioned gradation number conversion in which the error diffusion method is used is relatively complicated as compared with other methods of gradation number conversion, and the number of operations required for conversion processing is large.

However, the aforementioned color correction processing, for example, the color correction processing disclosed in Japanese Unexamined Patent Publication No. 4-18507 requires a much larger number of operations than the gradation number conversion processing in which the error diffusion method is used. Therefore, in the prior art in which gradation number processing is performed by the error diffusion method after the completion of color correction, it is necessary to consider the processing time required for both the color correction and the gradation number conversion. Accordingly, the processing time is greatly increased.

SUMMARY OF THE INVENTION

The present invention has been achieved in view of the above problems of the prior art.

Accordingly, a first object of the present invention is to provide an image processing apparatus capable of conducting color correction of high image quality at high speed while the memory capacity of a color correction table is reduced, and further no complicated interpolating operation is required.

A second object of the present invention is to provide an image processing apparatus capable of conducting color correction of high image quality at high speed while the number of operations necessary for color correction processing is reduced to be smaller than that necessary for the gradation number conversion processing in the later process without deteriorating image quality.

In order to accomplish the above and other objects, the present invention provides an image processing apparatus which conducts color correction on inputted color image data in accordance with the color reproduction properties of an image output apparatus and outputs the color-compensated image data, the image processing apparatus comprising:

- a color correction table memory for storing gradation compensating data of each color component in accordance with the color reproduction properties of the image output apparatus at each grid point in a color space divided into a grid, the color space having coordinate axes corresponding to each color component of the color image data;
- pre-gradation number conversion means for conducting pre-gradation number conversion on the values of the coordinates in the color space of the inputted color image data using a predetermined gradation number conversion method so as to convert the values of the coordinates into values of the most appropriate grid point in the color space; and
- color correction means for compensating the gradation number of each color component of the color image data when the gradation compensating data of a grid point corresponding to the values of the coordinates that has been subjected to pre-gradation number conversion is read out from the color compensating table memory.

The inventive image processing apparatus may further include post-gradation number conversion means which conducts post-gradation number conversion on the gradation number of each color component of the color image data compensated by the color correction means so as to convert the gradation number into a final gradation number in accordance with the image output apparatus, wherein the converted gradation number of the pre-gradation number conversion means is larger than the converted gradation number of the post-gradation number conversion means.

The pre-gradation number conversion means may employ an error diffusion method or a minimum average error method.

The post-gradation number conversion means may also employ an error diffusion method or a minimum average error method.

The matrix size used for error diffusion or mean error in the error diffusion method or the minimum average error method in the pre-gradation number conversion means is smaller than that used in the post-gradation number conversion means.

Further, the pre-gradation conversion means may employ a ordered dither method as a pre-gradation number conversion method for one portion of color components of the color image data, and an error diffusion method or a minimum average error method as a pre-gradation number conversion method for the other portion of color components.

In the image processing apparatus of the present invention, the coordinate position of inputted color image data in the color space is subjected to a pre-gradation number conversion so that it can be converted into the coordinate position of the most appropriate grid point satisfying a predetermined condition using the pre-gradation number conversion means. Then, the color correction means compensates the gradation number of each color component of the color image data when the gradation compensation data of the grid point corresponding to the coordinate position subjected to the pre-gradation number conversion is read out from the color correction table memory.

According to the present invention, when color image data is subjected to pre-gradation number conversion, the complicated interpolating operation required in the prior art, in which a plurality of pieces of grid data are used, can be omitted. As a result, the color correction operation can be performed at high speed in accordance with the image output apparatus. Therefore, an image processing apparatus can be provided by which color images are excellently reproduced.

In this case, the error diffusion method or the minimum average error method is preferably used for the pre-gradation number conversion method.

In the case where the gradation number of each color component of the inputted color image data is different from that of each color of the image output apparatus to be used, the gradation value of each color component, which has been subjected to color correction, is subjected to the gradation number conversion using the post-gradation number conversion means so that the gradation value of each color component can converted into a final gradation number in accordance with the image output apparatus.

When the post-gradation number conversion processing is performed as described above, quantization noise occurs during the conversion processing.

In order to reduce the quantization error generated in the pre-gradation number conversion processing compared with the quantization error generated in the post-gradation number conversion processing, the gradation number converted by the pre-gradation number conversion means is larger than that of the post-gradation number conversion means capable of being converted. As a result of the foregoing, the deterioration of image quality produced as a result of the pre-gradation number conversion processing, that is, in accordance with the color correction processing, can be reduced to a negligible low level.

As explained above, an image processing apparatus can be provided characterized in that, while the deterioration of image quality is suppressed, the number of operations required for color correction is reduced to be smaller than that required for the post-gradation number conversion processing performed in the later process, so that color correction processing and gradation number conversion processing can be performed at high speed. In this case, it is preferable that the error diffusion method or the minimum average error method be employed for the post-gradation number conversion means.

In the case where the matrix size of the pre-gradation number conversion means is set to be smaller than that of the post-gradation number conversion means, wherein the matrix size is used for error diffusion of mean error in the error diffusion method or the minimum average error method. Accordingly, the number of operations required in the pre-gradation number conversion can be made smaller, so that the deterioration of image quality can be effectively suppressed and color correction processing can be performed at higher speed.

Moreover, in the case where the ordered dither method, in which the number of operations is relatively small with respect to color components to which the resolving power of human eyes is low, is used for the pre-gradation number conversion method, and the error diffusion method or the minimum average error method is used, images of high quality can be provided with respect to other color components. As a result, the deterioration of image quality can be effectively suppressed, and color correction processing can be performed at higher speed.

BRIEF DESCRIPTION OF THE DRAWINGS

FIG. 1 is a block diagram showing an outline of the image processing system of the present invention;

FIG. 2 is a block diagram of a specific example of the image processing system shown in FIG. 1;

FIG. 3 is a schematic illustration of a color space divided into a grid;

FIG. 5 is a schematic illustration showing the positions of color image data and adjacent grid point color data in the color space;

DESCRIPTION OF THE PREFERRED EMBODIMENTS

Figure 4:
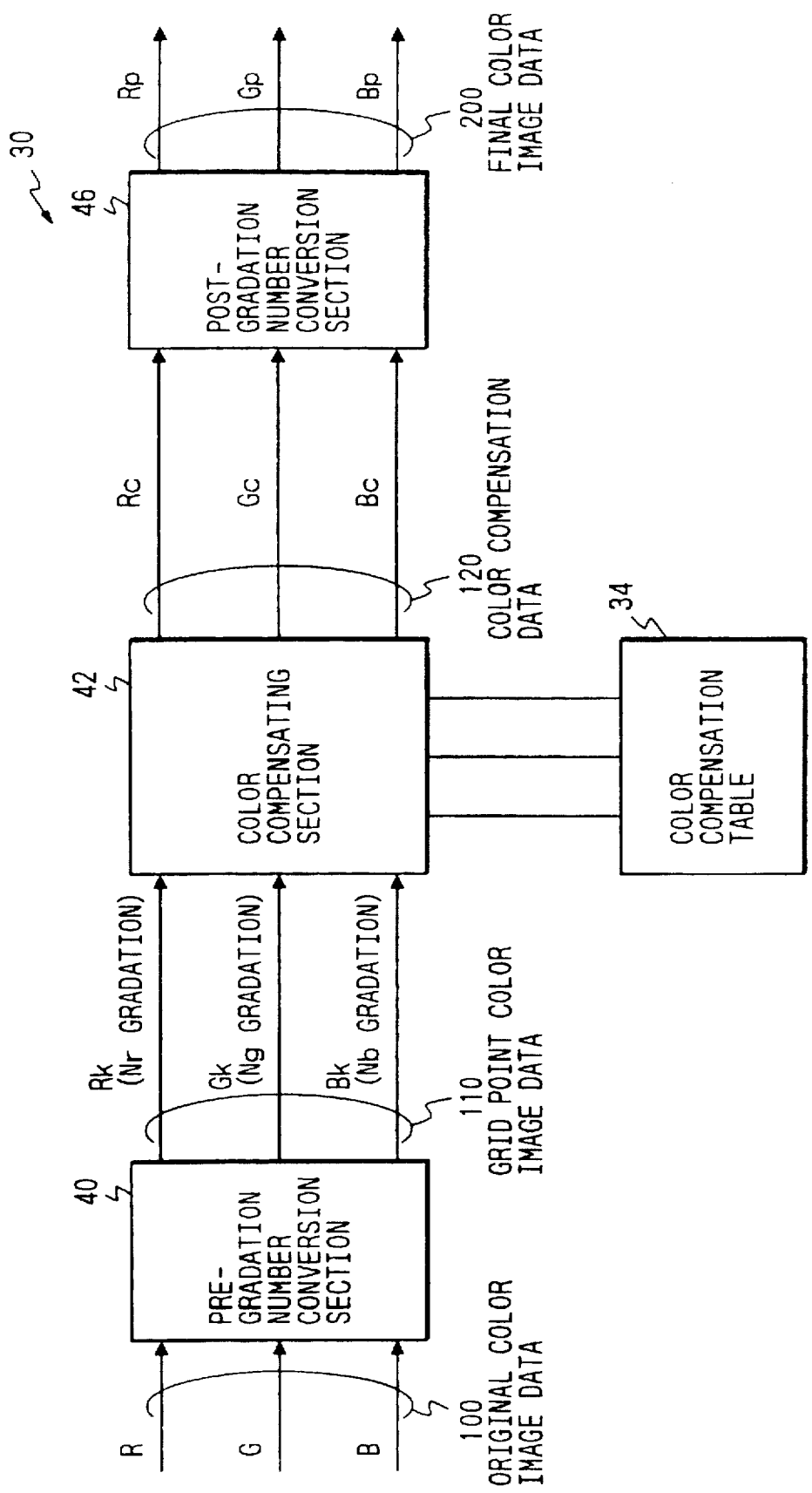
FIG. 4 is a functional block diagram of the image processing apparatus shown in FIG. 1.

Next, with reference to the accompanying drawings, a preferred embodiment of the image processing apparatus of the present invention will be explained in detail.

(1) Color Image Processing System

In FIG. 1, an example of the color image processing system of the present invention is shown.

Original color image data 100 outputted from an image input apparatus 10 is inputted to an image processing apparatus 30.

In the image processing apparatus 30, the inputted original color image data 100 is subjected to color correction in accordance with the color reproduction properties of an image output apparatus 200. In the case where the gradation number capable of being outputted from the image output apparatus 20 is smaller than the gradation number of color image data 100 capable of being outputted from the image input apparatus 10, the color-compensated color image data is subjected to post-gradation number conversion processing in which the gradation number is converted into a final value in accordance with the image output apparatus 20. The converted data is outputted to the image output apparatus 20 in the form of the final color image data 200.

In accordance with the inputted final color image data 200, the image output apparatus 20 reproduces and outputs the color image data with colors faithful to the original image.

In FIG. 2, an example of the color image processing system illustrated in FIG. 1 is shown.

The image input apparatus 10 is provided in the form of a scanner 12 which optically reads out a color image from a document. The scanner 12 outputs the read color image data in the form of original color image data 100 composed of three color components of R, G and B.

Except for the scanner 12 described above, for example, a video camera, a host computer used for the formation of computer graphics and other units can be employed for the image input apparatus 10.

For the system shown in the drawing, a color printer 22 is used for the image output apparatus 20, which cannot perform gradation control at the unit of a pixel.

As described before, in this color printer 22 it is necessary to conduct binary-coded processing by which the gradation number of each color component of the original color image data 100 outputted from the scanner 12 is reduced to two gradations corresponding to ON/OFF of each pixel.

Except for the aforementioned apparatus, for example, a color display 24 may be used for the image output apparatus 20.

In the case of a color display 24 for computer use, the gradation number capable of being displayed is usually smaller than that of a common television set for domestic use. Even when the color display 24 is used as described above, it is necessary to convert the gradation number of the original color image data 100 into a gradation number corresponding to the display 24.

In the system illustrated in the drawing, the image processing apparatus 30 includes a computer 32, compensation table memory 34, and memory 36.

The compensation table memory 34 stores a color table in which the three-dimensional color space composed of three colors of R, G and B is divided into grid-like sections, as illustrated in FIG. 3. The gradation compensation data of R, G, B obtained when the gradation data of R, G, B of each grid point is subjected to gradation value conversion, is stored at each grid point of the color table, so that, for example, the color of a color document to be read by the scanner 12 can be the same as that of an outputted color image printed on a recording sheet by the color printer 22.

The computer 32 conducts compensation processing on the original image data 100 inputted from the scanner 12, using the compensation data stored in the compensation table memory 34.

Further, the computer 32 conducts post-gradation number conversion processing in which the color-compensated color data is converted into a final gradation number coincident with the gradation number N of the image output apparatus 20 such as the color printer 22. The final color image data 200 subjected to conversion processing in this way may be outputted to the color printer as it is. Alternatively, the final color image data 200 may be outputted to the color printer after one image plane of final image data 200 has been stored in the memory 36, and then the data may be outputted to the color printer.

(2) Image Processing Apparatus

FIG. 4 shows a functional block diagram of the image processing apparatus 30 described above.

The image processing apparatus 30 of the example includes a pre-gradation number conversion section 40, color correction section 42, post-gradation number conversion section 46, and color correction table memory 34 described before.

First, the compensation data stored in the color correction table memory 34 will be explained as follows.

As illustrated in FIG. 3, a color space is set, which has coordinate axes corresponding to the color components of R, G, B of the inputted original color image data 100. Each coordinate axis is set in such a manner that the gradation number of each color component is represented by a coordinate value. This color space is divided into grid-shaped sections, and the gradation number compensating data of each color component is stored at each grid point 300.

Various methods are available for determining the compensating values to be stored in the color correction table memory 34. However, the process to determine the compensating values and to store them in the table is not essential to the present invention. Therefore, the details of such processes will be omitted here.

Usually, first of all, various R, G, B values are given to the objective output system (for example, the color printer 22), and the actually outputted results are subjected to color-measurement. Then, the relations between the R, G, B values given to the output system and those obtained when the output results are measured, are compared.

Next, the relations are viewed reversely, and the gradation number compensating data of each color component of R, G, B necessary for obtaining a corresponding color is determined for each grid point 300 and stored in the compensating table memory 34 to be used as compensating data.

As described above, the color compensating result corresponding to each grid point 300 is stored in the color compensating table 36. The larger the number of the divided sections of the color space, the more the image quality is improved. On the other hand, the capacity of the color compensating table memory is increased. Accordingly, an appropriate number of divided sections is determined from the balance between the capacity of the color compensating table and the image quality.

The image processing apparatus 30 of the example conducts image processing on the original color image data 100 as follows, using the compensating data stored in the color compensating table memory 34.

First, using a predetermined gradation number conversion method, the pre-gradation number conversion section 40 conducts pre-gradation number conversion in which the gradation numbers of color components of R, G, B of the original color image data 100 are converted into the gradation coordinate values at the most appropriate grid points in the color space shown in FIG. 3. Then, the converted data is outputted to the color compensating section 42 so as to be used as the grid point color image data 110. In this case, each color component of the original color image data 100 is subjected to pre-gradation number conversion so that R can be an Nr gradation, G can be an $N_g$ gradation, and B can be an Nb gradation. The obtained results are outputted as Rk, Gk and Bk.

In this connection, various methods such as a multi-coded error diffusion method, means error minimizing method and multi-coded ordered dither method may be employed for the gradation number conversion method in the pre-gradation number conversion section 40. The details will be described below.

The color compensating section 42 reads out the gradation compensating data of a grid point corresponding to the inputted grid point color image data 110 from the color compensating table memory 34. Then the gradation numbers of color components Rk, Gk, Bk of the grid point color image data 110 are compensated, and outputted to the post-gradation number conversion section 46 to be used as the color compensating data 120. In this case, the data of each color component of the color compensating data 120 is expressed by Rc, Gc, Bc.

The post-gradation number conversion section 46 conducts a post-gradation number conversion on the color correction data 120 provided from the color correction section 42 by the error diffusion method or the minimum average error method so that a target gradation number can be obtained, and the converted data is outputted in the form of the final color image data 200 in which each color data is expressed by Rp, Gp and Bp.

Consequently, when this final color image data 200 is outputted, for example, to the color printer 22, a color image having excellent color reproducing properties can be printed out by the color printer 22.

The construction described above is conventionally known, in which the color space is divided into grid-shaped sections and color correction data is recorded at each grid point so that the color correction table memory 34 is prepared.

However, the present invention is different from the example of the prior art in the following points:

Before the color correction table memory 34 is referenced, a pre-gradation number conversion is conducted by the pre-gradation number conversion section 40 so that the inputted original color image data 100 can become the color data at the grid point in the color correction table memory 34. Due to the foregoing, there can be omitted a complicated interpolating operation which has been conventionally performed when the color correction table is referred, so that the operation time necessary for color correction processing can be greatly shortened.

(3) Comparison between the Present Invention and the Prior Art

The color correction processing conducted by the apparatus of the present invention is explained as follows in comparison with the color correction processing of the prior art.

First, an example will be explained in which the error diffusion method or the minimum average error method is applied to the pre-gradation number conversion processing conducted in the pre-gradation number conversion section 40.

Assume that a color region having the gradation of R=12, G=20 and B=24 continues over a predetermined area in the original image data 100 inputted from the image input apparatus 10. Then, consideration is given to a case in which the color data in this color region is inputted into the image processing apparatus 30.

In FIG. 5, eight grid points close to coordinate positions in the color space of the original color image data 100 are shown. Each grid point is located at each apex of the cube shown in FIG. 5. The coordinate positions are given by the following expressions:

(R, G, B)=(8, 16, 16)
(R, G, B)=(16, 16, 16)
(R, G, B)=(8, 24, 16)
(R, G, B)=(16, 124, 16)
(R, G, B)=(8, 16, 32)
(R, G, B)=(16, 16, 32)
(R, G, B)=(8, 24, 32)
(R, G, B)=(16, 24, 32)

In the color correction table memory 34, the color correction values of the color components R, G, B are prepared with respect to the color data of each grid point 300.

In the case where color correction processing is performed using the prior art approach (for example, as disclosed in Japanese Unexamined Patent Publication No. 4-185075), the color data compensating value at the eight grid points close to the coordinate positions in the color space of the original image data 100 is referenced. After that, using the eight referenced color compensating values, interpolating operation processing is carried out for finding the weighted-mean in accordance with the distance between the coordinate position of the original color image data 100 and each grid point. In this way, color compensating processing is conducted. In the example shown in FIG. 5, the distance between the coordinate position of the original image data 100 and each grid point is set to be equal. Therefore, in the interpolating operation, the color compensating values of eight grid points are simply averaged, so that the compensating data of each color component of R, G and B is found.

On the other hand, the color compensating processing of the present invention is carried out according to the following procedure.

First, the pre-gradation number conversion section 40 conducts pre-gradation number conversion using the error diffusion method or the minimum average error method so that the inputted original color image data 100 can be either of the color data at the eight grid points.

Next, the color compensating section 42 conducts color compensating processing with reference to the color compensating table memory 34.

In the error diffusion method or the minimum average error method used in the pre-gradation number conversion section 40 of this example, each piece of data is converted into a data value of the adjacent grid point so that the local mean value in the color region can become equal to the original image data as precisely as possible.

Accordingly, in the example shown in FIG. 5 in which the coordinate positions of the original image data are located at the same distance with respect to each grid point, as a result of the pre-gradation number conversion, a color region can be obtained in which each data of the eight grid points respectively exists at the same ratio of about ⅛. As a result of the foregoing, when color correction is conducted with reference to the color correction table on the color data subjected to pre-gradation number conversion processing, a color region can be obtained in which the color compensating values of the eight grid points exist at an approximately same rate.

As described above, the result obtained in the color compensating processing in which a conventional interpolating operation is performed and the result obtained in the color compensating processing of the present invention are approximately the same in the case where a comparison is made with respect to a mean value in an appropriate image area. That is, in the color compensating section 42 of the present invention, quantization noise is added at each pixel when pre-gradation number conversion is carried out. In spite of this, in the case where a local mean value is obtained, approximately the same color compensating result as that in the case where the conventional interpolating operation is carried out can be obtained.

In the case where the gradation number of the image output apparatus is sufficiently large, problems are caused because the image quality is deteriorated by the quantization noise generated in the pre-gradation number conversion processing.

In the present invention, after this pre-gradation number conversion processing, post-gradation number conversion processing is conducted on the color-compensated image data using the post-gradation number conversion section 46 so that the color-compensated image data can be converted into a final gradation number corresponding to a number of gradation of the image output apparatus 20. Therefore, quantization noise is generated in accordance with the gradation number conversion. Consequently, if the quantization noise generated in the pre-gradation number conversion of the preparation stage is sufficiently reduced as compared with the quantization noise generated in the post-gradation number conversion of the final stage, no problems are caused in practical use. For this reason, the apparatus shown in the example is constructed in such a manner that the gradation number capable of being converted in the pre-gradation number conversion section 40 is sufficiently larger than the gradation number capable of being converted in the post-gradation number conversion section 46. Due to the foregoing, deterioration of image quality can be prevented in the pre-gradation number conversion processing.

Especially, in this example, since the error diffusion method or the minimum average error method is used for the gradation conversion in the post-gradation number conversion section 46, the amount of error can be minimized through both processes of the pre-gradation number conversion and the post-gradation number conversion in the case where a local mean value of the region is taken. For this reason, when the gradation number capable of being converted in the pre-gradation number conversion processing is sufficiently larger than the gradation number capable of being converted in the post-gradation number conversion processing as described in this example, an image quality can be obtained which is equal to that of the conventional compensation processing in which the interpolating operation is performed.

As an actual example, color correction and gradation number conversion were carried out under the following conditions:

In the case where the number of gradations of each color component of the original image data 100 is 256, the gradation number capable of being converted of the pre-gradation number conversion section 40 is 32 for each color component, and the gradation number capable of being converted of the post-gradation number conversion section 46 is two for each color component.

As a result of the experiment, reproduced images of high quality were obtained in which the image quality was the same as that of conventional images obtained when color correction was conducted after an interpolating operation and then the data was reduced to two gradations. Further, it was confirmed that an image quality appropriate for practical use was obtained even when the gradation number capable of being converted in the pre-gradation number conversion processing was reduced to about eight.

As described before, the smaller the converted gradation number is made in the pre-gradation number conversion processing, the smaller can be made the capacity of the color correction table memory 34. For example, in the case where the number of color components of the output data after the color correction in the color compensating section 42 is three and the data is composed of eight bits (one byte) for each color component, the capacity necessary for the color correction table memory 34 can be expressed by the following expression when the gradation number capable of being converted in the pre-gradation number conversion processing is 32 (5 bits) for each color:

2^(5 [bits]×3 [number of original image color components])×3 [number of output color components] ×8[width of output data]) (98,304×8 [bits])=98 K [bytes].

In the above expression, ^ indicates an exponential.

In the same manner, in the case where the gradation number capable of being converted in the pre-gradation number conversion is 16 for each color component, the memory capacity of the color compensating table is calculated in each case of eight gradations.

Then the obtained results are as follows:

In the case of 16 gradations, the memory capacity is 12K bytes, and in the case of 8 gradations, the memory capacity is 1.5 K bytes.

In the above explanations, the error diffusion method or the minimum average error method is used for the gradation number conversion in the pre-gradation number conversion section 40. The pre-gradation number conversion section 40 can convert the gradation number by other methods such as the ordered dither method, other than the above error diffusion method or the minimum average error method.

In this case, in the pre-gradation number conversion section 40, the amount of error cannot be minimized in the case where the local mean value in the region is taken. Accordingly, there is a possibility of the image quality being deteriorated. The deterioration of image quality may occur in the case where the gradation number 256 of original image data is greatly reduced to eight gradations. However, in the case where the gradation number used for expression of the original image data is not so different from the gradation number capable of being converted in the pre-gradation number conversion section 40, for example, in the case where the gradation number 64 of original image data is reduced to 32 gradations or 16 gradations in the pre-gradation number conversion processing, the image quality is not so strongly affected by the quantization noise. In the above case, a simpler gradation number conversion method such as an ordered dither method may be employed instead of the error diffusion method.

(4) More Specific Example of the Image Processing Apparatus

Next, a more specific example of the image processing apparatus of the present invention will be considered.

In this case, the following conditions are assumed: The original image data 100, each color of R, G, B of which is composed of eight bits and 256 gradations, is inputted into the image processing apparatus 30 from the scanner 12 shown in FIG. 2. The original image data 100 is subjected to image processing by the image processing apparatus 30, and then the final color image data 200 is outputted to the color printer 22. In the color printer 22 used here, three color ink colors, namely, cyan (C), magenta (M) and yellow (Y), are used, and the printing operation is conducted with two gradations, i.e., when each color dot is turned on there is a dot and when each color dot is turned off there is no dot.

Figure 6:
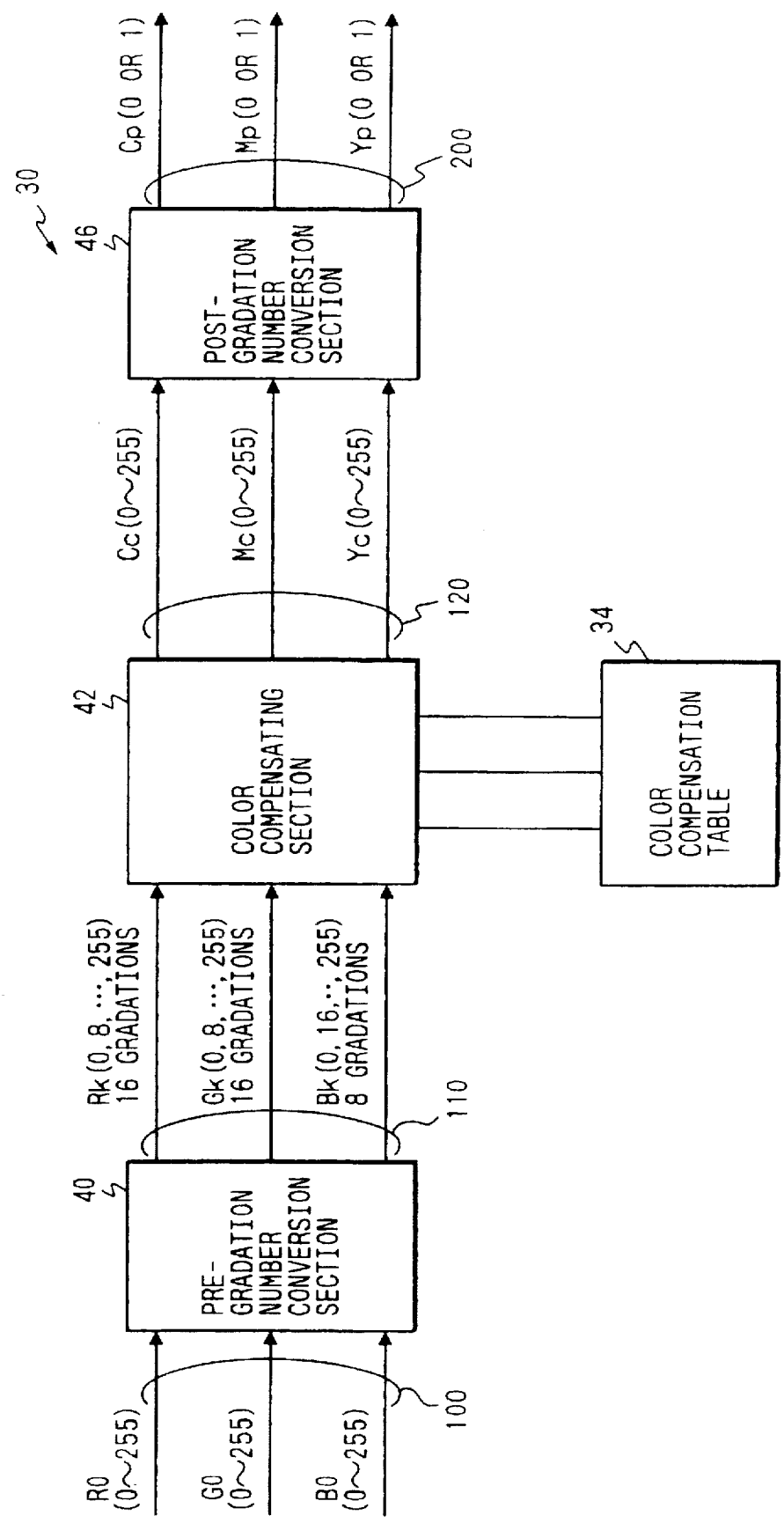
FIG. 6 is a functional block diagram of the image processing apparatus in the case where a color printer is used for the image output apparatus.

FIG. 6 is a specific block diagram of the image processing apparatus 30.

The pre-gradation number conversion section 40 and the color compensating section 42 conduct color correction on the inputted original color image data 100, and convert the calorimetric system from R, G, B to C, M, Y, and then outputs the color correction data 120. Then, using the post-gradation number conversion section 46, the color correction data 120 is binary encoded in accordance with the gradation number capable of being expressed with the printer 22, so that the final color image data 200 is outputted.

In this case, the compensating data is set in the color compensating table memory 34 in the following manner.

In order to determine the compensating data, first, only the post-gradation number conversion section 46 is taken out from the image processing apparatus illustrated in FIG. 6, so that a system with which the objective color printer 22 is combined is obtained. Then various C, M, Y values are applied to the post-gradation number conversion section 46 so that the data is binary encoded. After that, the data is outputted to the objective color printer 22, and the result subjected to color measurement. Then, the relation is investigated between the C, M, Y values given to the post-gradation number conversion section 46, and the R, G, B values obtained when the output of the color printer 22 is measured.

Next, the relation is reversely viewed, and the C, M, Y values are found which are necessary when the colors of the R, G, B values corresponding to the grid point color data in the color space are obtained. Then the obtained values are set in the color compensating table memory 34 so as to be used as the color correction data.

In the pre-gradation number conversion section 40, each of the color components of RO, GO, BO of the inputted original image data 100 is subjected to gradation number conversion, in which R and G are converted into 16 gradations and B is converted into eight gradations. Then, each of color components of Pk, Gk, Bk is outputted as the grid point color image data 110. This is the case illustrated in FIG. 4, in which Nr and Ng are respectively 16 and Nb is 8. Therefore, in this example, the data is multi-coded by the error diffusion method or the minimum average error method. In this case, a method of the prior art may be used for multiple encoding of the data.

Specific Example for Multi-coding the Data

Next, a specific example for multi-coding the data will be explained, wherein a case in which the B-component is converted into eight gradations is taken as an example.

The following case is assumed here:

The B-component of the original color image data 100 has 256 gradations from 1 to 255, and these gradations are octal-coded by the pre-gradation number conversion section 40 so that the values are eight types of values of pre_B shown below.

$$pre\_B[0], pre\_B[1], \ldots, pre\_B[7]$$

Specifically, the B-component of the original color image data 100 is subjected to pre-gradation number conversion in the following manner. In this specific example, the eight values are determined at approximately regular intervals. However, the eight values are not necessarily determined at regular intervals.

pre_B[0]=0
pre_B[1]=36
pre_B[2]=73
pre_B[3]=109
pre_B[4]=146
pre_B[5]=182
pre_B[6]=219
pre_B[7]=255

Also, seven types of threshold values used for the pre-gradation processing are defined as follows:

$$slsh\_B[0], slsh\_B[1], \ldots, slsh\_B[6]$$

Then, each threshold value is determined in the following manner:

$$pre\_B[i] < slsh\_B[i] < pre\_B[i+1]$$

$$(i=0, 1, 2, \ldots, 6)$$

In many cases, the threshold value is determined in the following manner:

$$slsh\_B[i]=(pre\_B[i]+pre\_B[i+1])/2$$

In this case, each threshold value described above is expressed as follows:

slsh_B[0]=18
slsh_B[1]=54
slsh_B[2]=91
slsh_B[3]=127
slsh_B[4]=164
slsh_B[5]=200
slsh_B[6]=236

The original color image data 100 inputted to the image processing apparatus 30 as image data is usually inputted from the left end pixel to the right end pixel, wherein the left upper pixel is used as a starting pixel. After one line of pixels have been inputted, the operation is shifted to the left end of a lower line, and the residual data is inputted toward the right end of the line in the same manner. When the image input operation is repeated in the above manner, image data corresponding to one image plane can be inputted.

The pre-gradation processing conducted by the pre-gradation number conversion section 40, that is, the order in which the original data 100 is octal-coded, is coincident with the order of image data input as described above. That is, while the pixel in the left upper corner of an image is used as a starting pixel, pixels are octal-coded from the left to the right end. After one line of pixels have been octal-coded, the operation is shifted to the left end of a lower line, and the pixels are octal-coded toward the right end in the same manner. The above operation is repeated, so that the image data corresponding to one image plane can be octal-coded.

Figure 7:
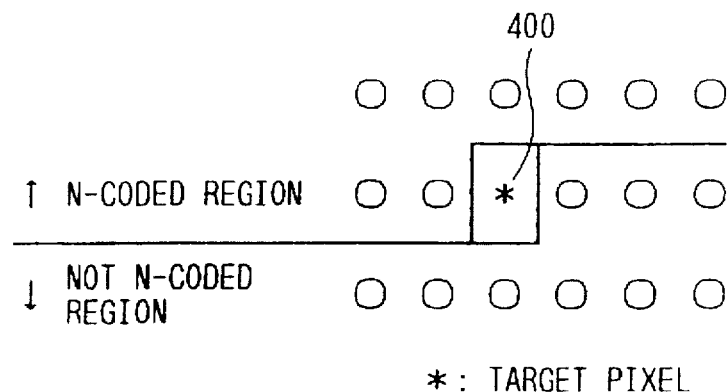
FIG. 7 is a schematic illustration showing an outline of the gradation number processing of image data.

As illustrated in FIG. 7, in this case, all pixels above the target pixel 400 and the pixels on the left of the line have already been multi-coded. Also, all pixels below the target pixel 400 and the pixels on the right of the line have not been multi-coded.

Figure 8A:
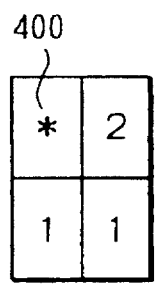
FIGS. 8(a), 8(b), 8(c) and 8(d) are schematic illustrations of examples of the weighted matrix in the case where the gradation number conversion processing is conducted using the error diffusion method.

As the pre-gradation processing, that is, as the method to make values to be octal-coded, for example, a case is considered in which the weighted matrix of error diffusion shown in FIG. 8(a) is used.

This weighted matrix shows that the pixels generated in the target pixel 400 in FIG. 8(a) are dispersed in such a manner that the ratio of dispersion is 2 (right adjacent pixels): 1 (lower pixels): 1 (right lower pixels).

Figure 9:
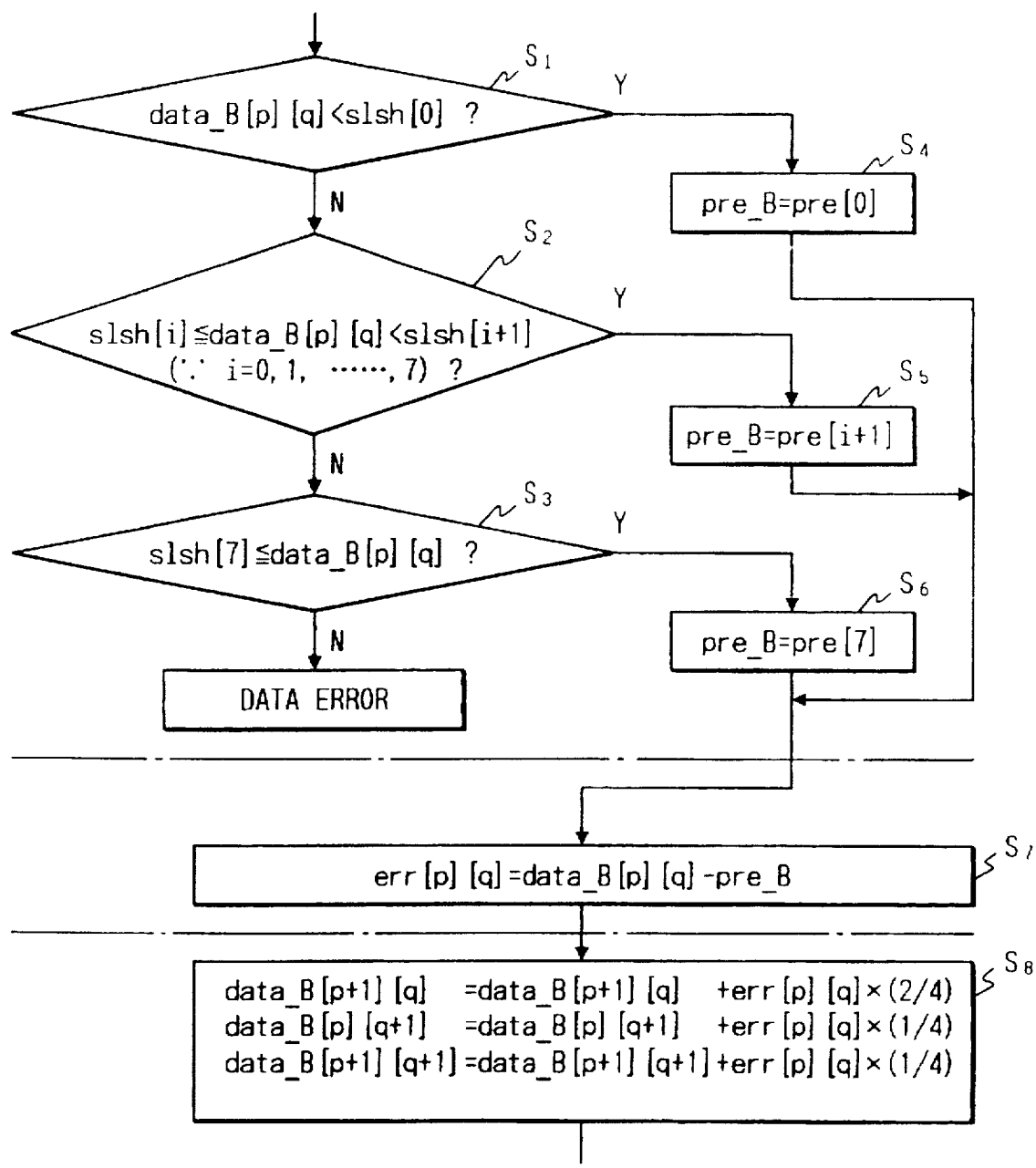
FIG. 9 is a flow chart of an example in which the error diffusion method is used for pre-gradation number conversion.

FIG. 9 shows a flow chart of the processing (the pre-graduation conversion processing) in which data is octal-coded by the pre-gradation number conversion section 40 using the error diffusion method.

In this case, a pixel located in the p-th line on the q-th row is targeted. The original color image data 100 of the B-component component of this pixel is expressed by data B[p][q], and consideration is give to a case in which this data B[p][q] is made to be octal-coded. In this connection, the quantization error caused when the pixel in the p-th line on the q-th row is made to be octal-coded, is expressed by err[p][q].

First Process: Octal Coding of Data (Steps S1 to S6)

First, when the target pixel data is compared with the threshold value (S1, S2, S3), the data is octal-coded, and the grid point color data pre_B is obtained (S4, S5, S6). However, data_B[p][q] shown in FIG. 9 is not the target pixel data itself, but is compensated data subjected to error diffusion from the pixel which has already been octal-coded. The error diffusion method will be explained in the third process.

Second Process: Error Computation (Step S7)

Error err[p][q] is found which has been caused in the target pixel in the process in which data is octal-coded.

Third Process: Error Diffusion (Step S8)

The error is diffused to the adjacent pixels which have not been octal-coded yet. In this case, in accordance with the weighted matrix shown in FIG. 8(a), ½ of the error is diffused to the right adjacent pixels, ¼ is diffused to the lower adjacent pixels, and ¼ is diffused to the right lower adjacent pixels, so that the diffused error is added onto the original color image data 100.

The target pixel data data_B[p][q] used in the first process described above is the data to which the error has been diffused in the above manner.

An example is described above in which data is octal-coded by the error diffusion method. A specific example in which the minimum average error method is used will be explained as follows.

Figure 10:
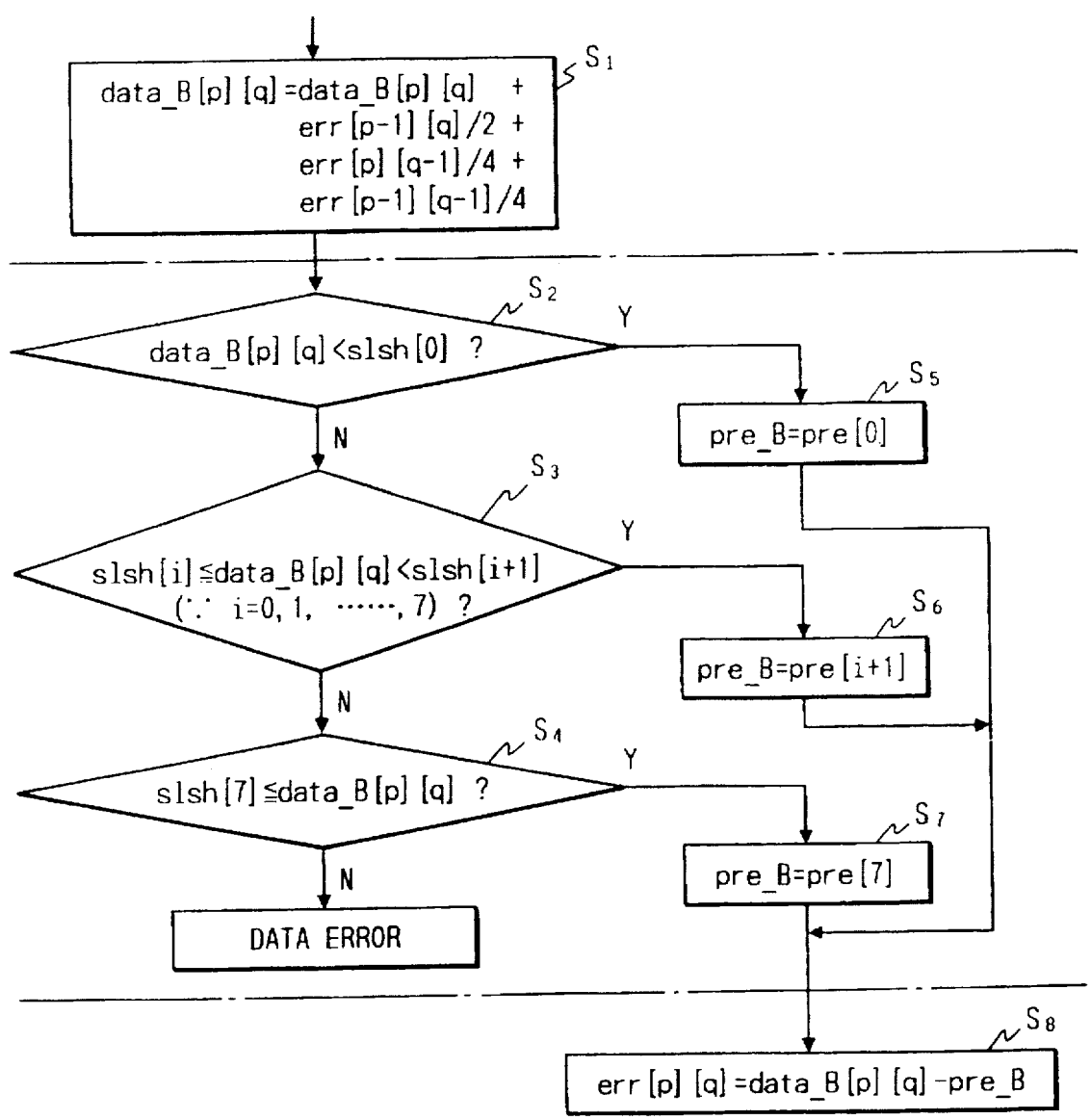
FIG. 10 is a flow chart of an example in which the minimum average error method is used for pre-gradation number conversion.

FIG. 10 is a flow chart showing the processing in which data is octal-coded using the minimum average error method.

First Process: Error Compensation (Step S1)

In this process, the target pixel is compensated by the error caused in the adjacent pixels when the data is made to be octal-coded.

Second Process: Octal Coding of Data (Steps S2 to S7)

Whereas this process is the same as Steps S1 to S6 shown in FIG. 9, a further explanation will be omitted here.

Third Process: Error Computation (Step S8)

In this process, error err[p][q] is found which has been caused in the target pixel in the process in which data is octal-coded. This process is the same in detail as Step S7 shown in FIG. 9.

A difference between the error diffusion method shown in FIG. 9 and the minimum average error method shown in FIG. 10 is described as follows:

In the error diffusion method, the error diffusing operation is performed right after error computation has been completed, and in the minimum average error method, the error diffusing operation is performed right before the target pixel is N-coded. Except for the processing conducted at both image ends, the two methods are equivalent.

Figure 8B:
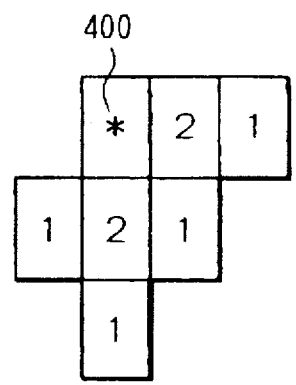
Figure 8C:
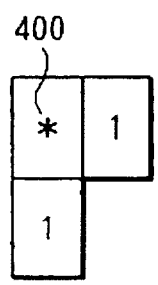
Figure 8D:
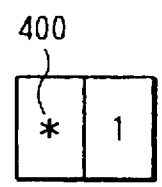

Concerning the weighted matrix of the error diffusion method, other than the example shown in FIG. 8(a), an example shown in FIG. 8(b) in which the matrix size is made larger, and examples shown in FIGS. 8(c) and 8(d) in which the matrix is further simplified, may be employed if necessary. The example shown in FIG. 8(d) shows a matrix which is most simplified, and only one pixel adjacent on the right is an object, the error of which is to be diffused.

Examples of the multi-coded error diffusion method are disclosed in Japanese Unexamined Patent Publication Nos. 3-18177, 3-34767, 3-80767 and 3-147480. Various methods can be employed in accordance with the application at hand.

A case is disclosed above in which the B-component contained in the original color image data 100 is converted into eight gradations using the pre-gradation conversion section 40. Other color components contained in the original color image data 100 such as the R-component and G-component are subjected to the pre-gradation number conversion by the same method so that they can be converted into 16 gradations.

As a result, each component of R, G and B of the original image data 100 inputted to the pre-gradation number conversion section 40 is subjected to pre-gradation number conversion as shown in the following expressions so that each component can be converted into the grid point color image data 110.

R component: 16-coded value of pre_R[0], pre_R[1], . . . . pre_R[15]

G component: 16-coded value of pre_G[0], pre_G[1], . . . pre_G[15]

B component: 8-coded value of pre_B[0], pre_B[1], . . . . pre_G[15]

Specific Example of Color correction Processing

The color correction section 42 conducts color correction processing on the grid point color data which has been subjected to the multi-coded processing (the pre-gradation processing). At the same time, the color correction means 42 converts the colorimetric system from R, G, B to C, M, Y. In other words, in this example, different from the example shown in FIG. 4, not only the color correction, but also the conversion of the colorimetric system from R, G, B to C, M, Y is simultaneously conducted.

Two cases are taken for examples; one is a case in which the color correction section 42 and color correction table memory 34 are implemented in software, and the other is a case in which they are implemented hardware.

Figures 11A, 11B, 12:
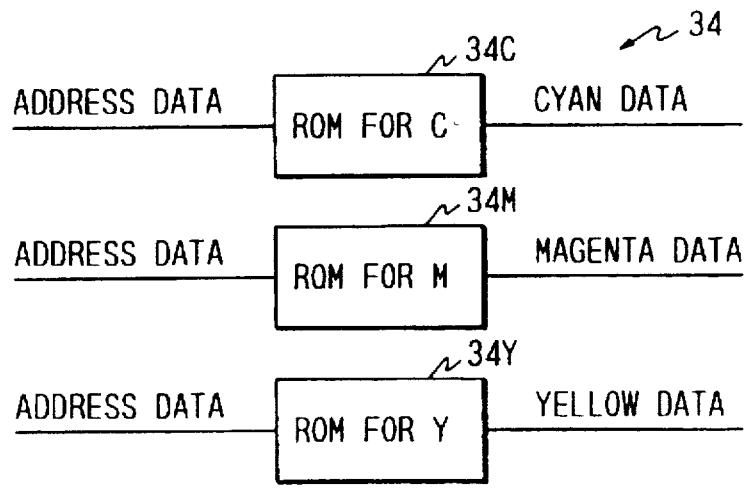
FIGS. 11(a) and 11(b) are schematic illustrations showing an example in the case where the color correction table is implemented in software.
FIG. 12 is a schematic illustration showing an example in the case where the color correction table is implemented hardware.

FIG. 11(a) shows an example in which the color correction table memory 34 is implemented in software using programming in the "C" computer language. The color correction tables of the color components of C, M and Y are respectively C_table, M_table and Y_table, which are arrayed in three dimensions. In this example, the unsigned char type array is adopted, so that the data of eight bits in the range from 0 to 255 can be accommodated as a result of color correction.

FIG. 11(b) is a view showing an example of the color compensating section 42 in which the grid point data, R of which is pre_R[i], G of which is pre_G[j], and B of which is pre_B[k], is converted into a CMY value corresponding to an amount of ink, referring to the three dimensional color compensating table shown in FIG. 11(a). Only when the array shown in FIG. 11(a) is referenced can the C, M and Y values subjected to color-compensation be obtained.

Next, in FIG. 12, an example is shown in which the color correction t able memory 34 is realized in hardware. In this example, a color correction table stored in a semiconductor memory is used. In the ROM 34C for C, ROM 34M for M and ROM 34Y for Y are respectively stored the results of color correction of the color components of C, M and Y. When a value determined in accordance with the grid point color data is applied to the ROn as address data, the compensated data of cyan, magenta and yellow is outputted corresponding to the value.

Figures 13, 14, 15:
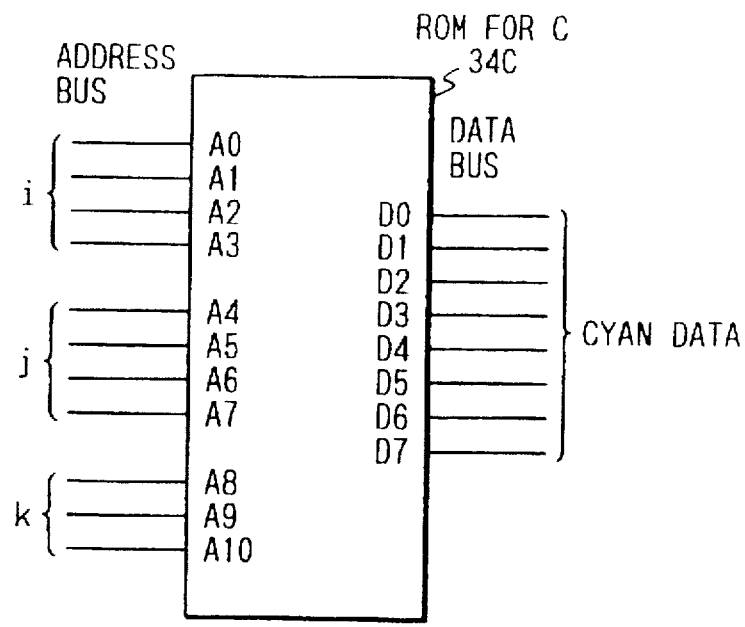
FIG. 13 is a schematic illustration of a more detailed example of the ROM for use in C shown in FIG. 12.
FIG. 14 is a schematic illustration of an example of post-gradation number conversion means.
FIG. 15 is a schematic illustration of an example of the color correction table used in the case where four color components are subjected to gradation number conversion.

FIG. 13 shows a more detailed example of the ROM 34C for C in FIG. 12. In this example, a ROM is used in which the address bus is 11 bits wide (A0 to A10), and the data bus is eight bits wide (D0 to D7). Values obtained when i, j and k values are respectively set to binary-numbered values in accordance with the grid point color data of pre_R[i], pre_G[j] and pre_B[k] are respectively applied to upper bits (A0 to A3) and middle bits (A4 to A10).

In this example, the following inequalities are satisfied:

$$0 \leq i \leq 15, 0 \leq j \leq 15, 0 \leq k \leq 7$$

Therefore, it is sufficient that four bits be allotted to i, four bits be allotted to j, and three bits allotted to k. The color correction data of cyan corresponding thereto is outputted to the data bus as a value of eight bits which is in the range from 0 to 255.

In the example shown in FIG. 12, three different ROMs are provided for each color component of C, M and Y. However, when the bit number of the address bus is increased and a color selection signal is added to the buses, it is sufficient to provide one ROM of large capacity. When a RAM in which data can be written is used instead of a ROM, the content of the memory table can be optionally rewritten.

In the examples shown in FIGS. 11 and 12, when the color compensating section 42 refers to the three dimensional table memory 34 in the manner of software or hardware, the color correction processing is carried out.

Specific Example of Post-gradation Number Conversion

After the color correction has been completed, the post-gradation number conversion section 46 conducts processing on the C, M and Y data, which has been color-compensated by the color compensating section 42, by the error diffusion method or the average error minimizing method, so that the data can be made to be binary-coded. Methods of the prior art may be applied to the above operation as they are. The binary-coding process conducted by the error diffusion method is approximately the same as the multi-coded process conducted by the pre-gradation number conversion section 40 shown in FIG. 9. A different point is that the process to make the data to be octal is replaced with the process to make the data to be binary-coded. The process to make the data to be octal-coded in the steps of S1 to S6 shown in FIG. 9 may be changed to the binary-coding process, and the data_B[p][q] may be replaced with data_C[p][q], and then the binary-coding process may be performed as shown in FIG. 14. In this case, when the cyan data is binary-coded to 255, there are cyan dots, and when the cyan data is binary-coded to 0, these are no cyan dots. The following processes of error computation and error diffusion are the same as Steps S7 and S8 shown in FIG. 9. Therefore, a further explanation will be omitted here.

However, if the size of the error diffusion weighted matrix is made too small in this binary-coding process, a distinctive dot pattern causing deterioration of image quality tends to occur. For this reason, a matrix, the size of which is a little larger than the one used in the multi-coding processing in the pre-gradation number conversion, may be used (for example, the one shown in FIG. 8(b) may be used).

Instead of the error diffusion method, the minimum average error method of the example shown in FIG. 10 may be used, in which the process to multi-code the data is changed to a binary-coding process.

One of the remarkable characteristics of the above example will be described as follows:

Even when the size of the error diffusion weighted matrix used in the process of multi-coding the data in the pre-gradation number conversion section 40, is very small as illustrated in FIGS. 8(a) to 8(d), images of sufficiently high quality can be obtained. Usually, in the case where binary-coding processing is carried out, if the error diffusing operation is conducted with a small matrix in which the error diffusing object is only the adjacent two pixels as illustrated in FIG. 8(c), a pattern peculiar to the error diffusion becomes remarkable, in which dots consecutively appear forming a line, so that the image quality is deteriorated. However, in the case where the gradation number to be converted is sufficiently large like the pre-gradation number conversion section 40 of the present invention, the image quality is not so deteriorated even when the size of the error diffusion matrix is reduced as illustrated in FIG. 8(c). For this reason, a smaller size matrix than the error diffusion matrix used in the post-gradation number conversion section 46 in the later stage may be used in the pre-gradation number conversion section 40. The error diffusion process shown in Step S8 in FIG. 9 occupies the greater portion of the operation of error diffusion processing, and the number of the operations is approximately proportional to the size of the error diffusion weighted matrix. Therefore, the number of operations of the multi-coded processing conducted in the pre-gradation number conversion section 40 is much smaller than that of the binary-coded processing conducted in the post-gradation number conversion section 46. Further, the color correction conducted in the color compensating section 42 of the present invention only refers to the content of the color correction table memory 34. Accordingly, it is possible to greatly reduce the total amount of data processing conducted in the pre-gradation number conversion section 40 and color compensating section 42 compared with the amount of data processing conducted in the post-gradation number conversion section 46 in the later stage.

In the examples of the color compensating section 42 and color compensating table memory 34 shown in FIGS. 11 and 12, RGB is converted to CMY simultaneously with color correction. However, RGB may be converted to the four color components of CMYK for a printer in which black ink K is used as well as the three colors of CMY. For example, in the case where the color correction table memory 34 in the example shown in FIG. 11(a) is extended to four colors, the result is shown in FIG. 15. When the number of the color correction tables to be prepared is increased, it is possible to cope with a case in which the number of colors necessary for color correction is increased.

In the above example, the original color image data 100 is composed of the three color components of RGB. However, it is possible to use original color image data 100 expressed by any colorimetric system such as CMY, L*a*b* of CIE, and XYZ of CIE. Also, as illustrated in FIG. 6, the color image data may be converted by the color compensating section 42 so that it can be expressed by another calorimetric system.

Example of Pre-gradation Number Conversion Section 40 in Which Ordered Dither Method Is Used In the above example, the error diffusion method or the minimum average error method is used for the pre-gradation number conversion section. However, it is possible to use a gradation number conversion method such as the ordered dither method.

Figure 16:
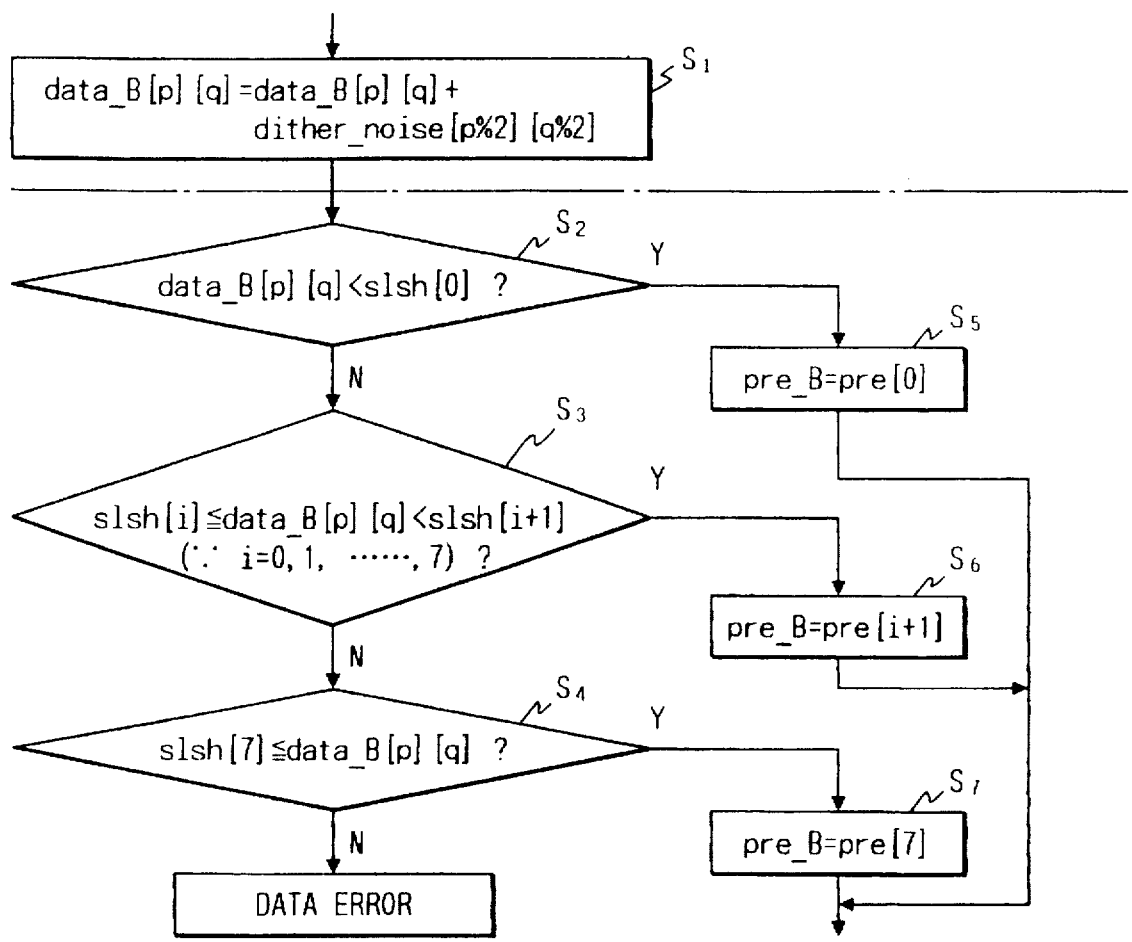
FIG. 16 is a flow chart of an example in which the ordered dither method is used for pre-gradation number conversion.

FIG. 16 shows an example of the pre-gradation number conversion section 40 in which the ordered dither method is used.

In this example, the following case is assumed: The B-component of the original color image data 100 has a value of 64 gradations from 0 to 63. Then the B-component is converted into 17 gradations by the pre-gradation number conversion section 40 in which the ordered dither method is used. In this case, the size of the dither matrix is 2×2. After ordered dither noise which varies at the period of two pixels in both longitudinal and lateral directions has been added to the data (S1), a comparison is made between the data and the threshold value (S2 to S4), and the data is subjected to gradation number conversion so that it can be converted to the values of 17 gradations of 0, 1, 2, . . . , 16 (S5 to S7).

That is, the 16 threshold values of slsh_B[i] are set as follows:

slsh_B[i]=(i+1)×4−2(i=0, 1, . . . , 15)

Next, ordered dither noise (dither_noise[p%2][q%2]) decisively determined by the pixel positions of p and q is added to target pixel data data_B[p][q] (S1). In the above expression, % is an excess operator, and p%2 is a remainder which means "when p is divided by 2". When q is an even number, p%2 becomes 0, and when q is an odd number, p%2 becomes 1. In this case, for example, the values of dither_noise[p%2][q%2] are determined as follows:

dither_noise[0][0]=1 dither_noise[0][1]=−1 dither_noise[1][0]=−2 dither_noise[1][1]=0

Subsequently, when the data is compared with the threshold value of slsh__B[i], it is converted to 17 gradations (S2 to S4). In this way, the blue component pre__B of the grid point color data is obtained (S5 to S7).

When a comparison is made between the present example and the example of the minimum average error method shown in FIG. 10 in which the data is converted to eight gradations, in the case of the example of the minimum average error method, the error diffused from the adjacent binary-coded pixels is added to the target pixel data of data__B[p][q]; however, in the case of the present example, the periodic noise dither__noise[p%2][q%2] decisively determined by the position of the target pixel is added. Only the aforementioned point is essentially different between the two examples. Accordingly, in the example shown in FIG. 10, Step S8 corresponding to the error computation process is not required. In the case where the ordered dither method is used as shown in FIG. 16, the error diffusion computation is not required as compared with the minimum average error method and error diffusion method.

Accordingly, the computation speed can be further increased, and a memory to store the error becomes unnecessary. Therefore, the invention is greatly advantageous in that hardware resources can be saved.

On the other hand, there is no known way to minimize the error caused in the case where a local mean value of the region is utilized. Therefore, continuous gradation reproductivity cannot be compensated.

When the number of gradations is excessively reduced by the pre-gradation number conversion, the following problems are caused, and there is a possibility that the image quality is deteriorated:

(1) When the matrix size is reduced, the number of gradations capable of being reproduced is reduced. Accordingly, there is a possibility of the occurrence of pseudo-contours.

(2) Even when the number of gradations capable of being reproduced is increased by increasing the matrix size, the resolution is lowered.

However, in the case where the gradation number of the original image data is reduced to about ¼ as shown in the example in FIG. 16, the pseudo-contours are not caused even when a small matrix size of 2×2 is applied. Therefore, the deterioration of resolution can be minimized, so that significant advantages can be obtained.

In general, the most appropriate pre-gradation number conversion method may be employed so that the processing speed, necessary memory capacity and image quality can be well-balanced. For example, the pre-gradation conversion method to be employed may be determined from the following viewpoints.

(a) In the case where the resolution of the final output apparatus is sufficiently high and no problems are caused even if the resolution is slightly deteriorated in the pre-gradation number conversion, the ordered dither method of a rather large matrix size is employed.

(b) In the case where the gradation number of the original image data is not large from the beginning and it is not necessary to greatly reduce the gradation number in the pre-gradation number conversion, the ordered dither method of a rather small matrix size is employed.

(c) In the case where priority is given to image quality, and also in the case where the gradation number is greatly reduced in the pre-gradation number conversion so as to reduce the capacity of the color correction table, the error diffusion method is employed.

Of course, gradation number conversion methods other than the error diffusion method and ordered dither method may be employed.

Also, a construction may be adopted in which only the B-component is subjected to the ordered dither method, and R- and G-components are subjected to the error diffusion method so that the pre-gradation number conversion can be performed. In general, the resolving power of the human eye with respect to the B-component is lower than the resolving power of the human eye with respect to the R- and G-components. Accordingly, the above construction is also effective.

As explained above, according to the present invention, the color image data is subjected to the pre-gradation number conversion by the pre-gradation number conversion means so that the data can be converted into the data of the grid point in the color correction table. Consequently, the color correction table is only referenced in the later color correction process. As a result, an image processing apparatus can be provided in which the color compensating processing of high quality can be carried out at a very high speed without increasing the capacity of the color correction table.

Further, the invention may be constructed so that the conversion gradation number in the pre-gradation number conversion means is larger than that in the post-gradation number conversion means. Therefore, the quantization noise generated in the pre-gradation number conversion is lower than the quantization noise generated in the post gradation number conversion, so that the deterioration of image quality caused in the pre-gradation number conversion can be neglected.

Further, the error diffusion method or the minimum average error method can be used for multi-coding in the pre-gradation number conversion section. Accordingly, although the error caused in the process of pre-gradation number conversion is added, that is, although the quantization noise is added in view of each pixel, the excellent color correction result can be provided when a local mean value is taken.

Still further, the matrix size of the pre-gradation number conversion section is set to be small, the matrix size used for the error diffusion of the mean error in the error diffusion method or the minimum average error method. Accordingly, the number of operations of the pre-gradation number conversion can be reduced, so that the deterioration of image quality can be effectively suppressed, and further the color correction processing can be carried out at a higher speed.

According to still further aspects of the invention, the ordered dither method in which the number of required operations is relatively small is employed for the pre-gradation number conversion method with respect to the color components to which the resolving power of the eye is low, and the error diffusion method or the minimum average error method by which images of high quality can be obtained is used for the pre-gradation number conversion method with respect to other color components. As a result, the deterioration of image quality can be more effectively suppressed, and the color correction processing can be carried out at a higher speed.

What is claimed is:

1. A computer program embodied on a computer-readable medium for color compensating input color image data in accordance with the color reproduction properties of an image output apparatus and outputting the color-compensated image data, the input color image data having a plurality of color components represented by gradation numbers, the computer program being implemented using a computer and comprising:

computer-readable program code for storing gradation compensating data of each of the plurality of color components at respective grid points in a color space divided into a grid, wherein said color space has coordinate axes corresponding to each of the plurality of color components of the color image data, and wherein said gradation compensating data relates to the color reproduction properties of the image output apparatus;

computer-readable program code for converting the gradation numbers of the input color image data into values corresponding to the most appropriate grid points in said color space by using a pre-determined gradation number conversion method based on a pre-determined condition; and computer-readable program code for compensating the gradation numbers of the plurality of color components of the input color image data based on the gradation compensating data of the grid points corresponding to the converted gradation numbers.

2. The computer program embodied on a computer-readable medium according to claim 1, further comprising:

computer-readable program code for conducting post-gradation number conversion on the gradation number of each color component of the compensated color image data so as to convert said gradation number into a final gradation number in accordance with said image output apparatus, wherein the converted gradation number is larger than the final gradation number.

3. A programmable apparatus directed by a computer program for color compensating input color image data in accordance with the color reproduction properties of an image output apparatus and outputting the color-compensated image data, the input color image data having a plurality of color components represented by respective gradation numbers, the programmable apparatus comprising:

a color compensation table memory for storing gradation compensating data for each of the plurality of color components at grid points in a color space divided into a grid, wherein said color space has coordinate axes corresponding to each of the plurality of color components of the color image data, and wherein said gradation compensating data relates to the color reproduction properties of the image output apparatus;

a pre-gradation number converter for converting the gradation numbers of the input color image data into values corresponding to the most appropriate grid points in said color space by using a pre-determined gradation number conversion method based on a pre-determined condition; and a color corrector for compensating the gradation numbers of the plurality of color components of the input color image data based on the gradation compensating data of the grid points corresponding to the converted gradation numbers converted by said pre-gradation number converter.

4. The programmable apparatus according to claim 3, further comprising a post-gradation number converter for conducting post-gradation number conversion on the gradation number of each color component of the color image data compensated by said color corrector so as to convert said gradation number into a final gradation number in accordance with said image output apparatus, wherein the converted gradation number of said pre-gradation number converter is larger than the converted gradation number of said post-gradation number converter.

5. A computer-readable storage medium containing program instructions for causing a computer-implemented apparatus to color compensate input color image data in accordance with the color reproduction properties of an image output apparatus and to output the color-compensated image data, the input color image data having a plurality of color components represented by respective gradation numbers, the computer-readable storage medium comprising:

program instructions for storing in a color compensation table memory gradation compensating data for each of the plurality of color components at grid points in a color space divided into a grid, wherein said color space has coordinate axes corresponding to each of the plurality of color components of the color image data, and wherein said gradation compensating data relates to the color reproduction properties of the image output apparatus;

pre-gradation number converter program instructions for converting the gradation numbers of the input color image data into values corresponding to the most appropriate grid points in said color space by using a pre-determined gradation number conversion method based on a pre-determined condition; and color corrector program instructions for compensating the gradation numbers of the plurality of color components of the input color image data based on the gradation compensating data of the grid points corresponding to the converted gradation numbers converted by said pre-gradation number converter program instructions.

6. The computer-readable storage medium according to claim 5, further comprising post-gradation number converter program instructions for conducting post-gradation number conversion on the gradation number of each color component of the color image data compensated by said color corrector program instructions so as to convert said gradation number into a final gradation number in accordance with said image output apparatus, wherein the converted gradation number of said pre-gradation number converter program instructions is larger than the converted gradation number of said post-gradation number converter program instructions.

* * * * *